US009635725B2

(12) United States Patent
Wang et al.

(10) Patent No.: US 9,635,725 B2
(45) Date of Patent: Apr. 25, 2017

(54) BACKLIGHT MODULE DETECTION SYSTEM AND BACKLIGHT MODULE DETECTION METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xin Wang, Beijing (CN); Moyu Zhu, Beijing (CN); Tianxiao Zhao, Beijing (CN); Jian Ren, Beijing (CN); Yonghua Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/096,441

(22) Filed: Apr. 12, 2016

(65) Prior Publication Data

US 2016/0360587 A1 Dec. 8, 2016

(30) Foreign Application Priority Data

Jun. 2, 2015 (CN) .......................... 2015 1 0295678

(51) Int. Cl.
*G06F 3/038* (2013.01)
*H05B 33/08* (2006.01)

(52) U.S. Cl.
CPC ..... *H05B 33/0845* (2013.01); *H05B 33/0815* (2013.01)

(58) Field of Classification Search
CPC .......... G09G 3/36; G09G 3/03; G09G 3/3688; G09G 3/3648; G09G 2330/021; G09G 2310/027; G09G 5/006
(Continued)

(56) References Cited

U.S. PATENT DOCUMENTS 8,035,315 B2 * 10/2011 Zhao ................. H05B 33/0818 315/299
2008/0068327 A1 3/2008 Chien
(Continued)

FOREIGN PATENT DOCUMENTS

CN 101153989 A 4/2008
CN 102257881 A 11/2011
(Continued)

OTHER PUBLICATIONS

The First Office Action dated Jan. 24, 2017 corresponding to Chinese application No. 201510295678.1.

*Primary Examiner* — Minh D A
(74) *Attorney, Agent, or Firm* — Nath, Goldberg & Meyer; Joshua B. Goldberg; Leonid D. Thenor

(57) ABSTRACT

The present disclosure provides a backlight module detection system and a backlight module detection method. The backlight module detection system includes a control unit and a drive unit, the control unit is used for outputting a control signal to the drive unit based on an input code; and the drive unit is used for generating a drive control signal corresponding to the code under the control of the control signal outputted from the control unit, and generating and outputting a drive signal corresponding to the code based on the drive control signal, the drive signal being used for driving a backlight module. The drive signal can be used to drive the backlight module so as to achieve the detection of the backlight module; the backlight module detection system
(Continued)

can output the signal required for detecting the backlight module, and has a simple structure and low cost.

13 Claims, 1 Drawing Sheet

(58) Field of Classification Search
USPC ................................ 345/204, 156, 207, 690
See application file for complete search history.

(56) References Cited

U.S. PATENT DOCUMENTS

| | | | | |
|---|---|---|---|---|
| 2013/0249825 A1* | 9/2013 | Kang | G06F 3/03547 | 345/173 |
| 2014/0160176 A1* | 6/2014 | Nose | G09G 3/3406 | 345/690 |
| 2015/0097783 A1* | 4/2015 | Hsu | G06F 1/1616 | 345/173 |

FOREIGN PATENT DOCUMENTS

| | | |
|---|---|---|
| CN | 203192363 U | 9/2013 |
| CN | 104516570 A | 4/2015 |
| TW | 200733027 A | 9/2007 |

* cited by examiner

BACKLIGHT MODULE DETECTION SYSTEM AND BACKLIGHT MODULE DETECTION METHOD

CROSS-REFERENCE TO RELATED APPLICATION

This application claims priority to Chinese Patent Application No. 201510295678.1, filed on Jun. 2, 2015, the contents of which are incorporated by reference in the entirety.

FIELD OF THE INVENTION

The present invention relates to the field of display technology, and particularly to a backlight module detection system and a backlight module detection method.

BACKGROUND OF THE INVENTION

In recent years, mobile terminal products such as mobile phones, tablet computers, and the like have developed rapidly. In addition to pursuit of extreme in hardware configuration, terminal manufacturers also pay more attention to user experience of mobile terminals.

In consideration of user experience of mobile terminals, the terminal manufactures require that a backlight source of a liquid crystal display module can be lighted up by a low current. In order to ensure that product brightness can bring a relatively soft visual experience to a user instead of dazzling the user when a mobile terminal product is used in a dark environment, the minimum brightness of the liquid crystal display module needs to be lower than a certain threshold (the threshold varies from manufacturer to manufacturer, for example, products of Apple Inc. are mostly required to have a minimum brightness smaller than 3~5 $cd/m^2$), which actually requires that the liquid crystal display module can ensure not only a display function but also a uniform display under a low current. The demand for low current driving capacity of the liquid crystal display module is actually the demand for low current driving capacity of the backlight source (e.g., backlight LED). Therefore, it is necessary to add a low current detection procedure for the backlight source in shipment and incoming detection of the backlight source, to ensure that the liquid crystal display module meets the demand of the terminal manufacturers.

However, currently, a common backlight source detection device cannot provide a current of 500 uA or even lower e.g., 150 uA~200 uA); moreover, a detection device which can provide such a low current is relatively high in cost, and not convenient to move, carry, and apply in large quantities.

SUMMARY OF THE INVENTION

In view of the forgoing technical problems existing in the prior art, the present disclosure provides a backlight module detection system and a backlight module detection method. The backlight module detection system can generate and output, based on an input code, a drive signal corresponding to the input code, and the drive signal can be used to drive the backlight module to be detected, thereby achieving detection of the backlight module; the backlight module detection system can output a signal required for detecting the backlight module, and meanwhile, has a simple structure and low cost.

The present disclosure provides a backlight module detection system including a control unit and a drive unit, wherein, the control unit is used for outputting a control signal to the drive unit based on an input code; and the drive unit is used for generating a drive control signal corresponding to the input code under the control of the control signal outputted from the control unit, and generating and outputting a drive signal corresponding to the input code based on the drive control signal, the drive signal being used for driving a backlight module to be detected.

Optionally, the con unit includes a first control module and a storage module, wherein the storage module is used for storing the input code; and the first control module is used for outputting the control signal to the drive unit based on the input code.

Optionally, the drive unit includes a drive control module and a drive module, wherein the drive control module is used for receiving the control signal, generating the drive control signal corresponding to the input code under the control of the control signal, and outputting the drive control signal to the drive module; and the drive module is used for receiving the drive control signal, and generating and outputting the drive signal corresponding to the input code based on the drive control signal.

Optionally, the backlight module detection system further includes a processing and display unit, which is used for receiving the drive signal outputted from the drive module, and processing and displaying the drive signal.

Optionally, the processing and display unit includes an A/D conversion module, a second control module and a display module, the A/D conversion module is used for converting the drive signal from an analog quantity to a digital quantity, and transmitting the drive signal in a digital form to the second control module;

the second control module is used for receiving the drive signal in a digital form and controlling the display module to display the drive signal in a digital form; and the display module is used for displaying the drive signal in a digital form.

Optionally, the control unit includes a single-chip microcomputer or a central processing chip;

the drive control module includes a liquid crystal display module, which includes a drive circuit, the drive circuit being capable of generating a pulse width modulated signal, as the drive control signal, corresponding to the input code under the control of the control signal, and outputting the pulse width modulated signal to the drive module;

the drive module includes a light emitting diode drive circuit, which is used for receiving the pulse width modulated signal, and generating and outputting a current signal, as the drive signal, corresponding to frequency and duty ratio of the pulse width modulated signal based on the pulse width modulated signal; and the backlight module to be detected includes a light emitting diode as a light source, and the current signal is used for driving the light emitting diode.

Optionally, the processing and display unit further includes a calculation module used for calculating, based on the current signal outputted from the drive module, a voltage signal corresponding to the current signal and transmitting the voltage signal to the A/D conversion module;

the A/D conversion module is used for converting the received voltage signal from an analog quantity to a digital quantity, and transmitting the voltage signal in a digital form to the second control module;

the calculation module is used for calculating, based on the voltage signal in a digital form received by the second control module, a current signal in a digital form corresponding to the voltage signal in a digital form, and transmitting the current signal in a digital form to the second control module; and the second control module is used for receiving the current signal in a digital form, and controlling the display module to display the current signal in a digital form.

Optionally, the A/D conversion module, the second control module and the calculation module are all integrated in the single-chip microcomputer or the central processing chip; and the display module is implemented by the liquid crystal display module.

Optionally, the current signal outputted by the drive module has a value ranging from 100 μA to 1 mA; and the input code corresponds to the value of the current signal.

Optionally, the input code is obtained by calculating a drive signal required for detecting the backlight module to be detected.

The present disclosure further provides a backlight module detection method, including steps of: receiving a code; generating, based on the code, a drive control signal corresponding to the code, and generating and outputting a drive signal corresponding to the code based on the drive control signal; and driving a backlight module to be detected by using the drive signal, to perform detection.

Optionally, the backlight module detection method further includes a step of processing and displaying the drive signal.

Optionally, the code is obtained by calculating a drive signal required for detecting the backlight module to be detected.

The beneficial effects of the present disclosure are as follows:

in the backlight module detection system provided by the present disclosure, with the control unit and the drive unit, the backlight module detection system can generate and output, based on the input code, the drive signal corresponding to the input code, and the drive signal can be used to drive the backlight module to be detected, thereby achieving detection of the backlight module; the backlight module detection system can output a signal required for detecting the backlight module, and meanwhile, the backlight module detection system has a simple structure and low cost.

DETAILED DESCRIPTION OF THE EMBODIMENTS

To provide a better understanding of the technical solutions of the present invention for those skilled in the art, a backlight module detection system and a backlight module detection method provided by the present invention will be further described in detail below in conjunction with the accompanying drawings and the specific implementations.

Figure 1:
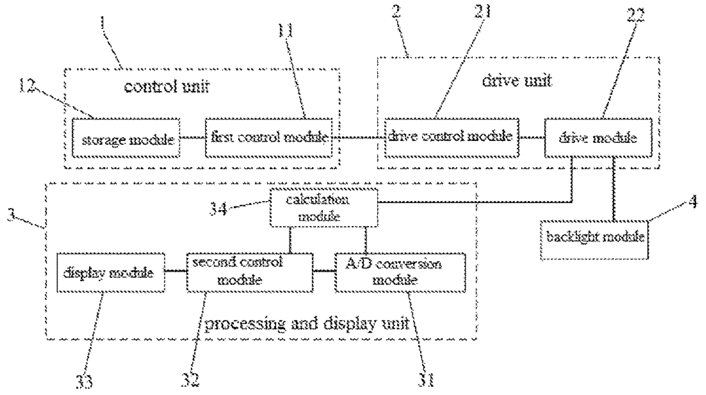
FIG. 1 is a block diagram of a backlight module detection system according to embodiments of the present invention.

FIG. 1 is a block diagram of a backlight module detection system according to embodiments of the present invention. As shown in FIG. 1, the backlight module detection system includes a control unit 1 and a drive unit 2. The control unit 1 is used for outputting a control signal to the drive unit 2 based on an input code; the drive unit 2 is used for generating a drive control signal corresponding to the input code under the control of the control signal outputted from the control unit 1, and generating and outputting a drive signal corresponding to the input code based on the generated drive control signal, the drive signal being used for driving a backlight module 4 to be detected.

It should be noted that, in each detection process of the backlight module detection system according to the embodiments of the present invention, only one code needs to be inputted to the control unit 1, and said code corresponds to a drive signal finally outputted from the backlight module detection system to the backlight module 4 to be detected, that is, said code is obtained by calculating a drive signal required for detecting the backlight module.

With the control unit 1 and the drive unit 2, the backlight module detection system generates and outputs, based on the input code, the drive signal corresponding to the input code. Since the code input to the control unit 1 is obtained by calculating the drive signal required for detecting the backlight module, the drive signal finally outputted from the backlight module detection system can be used to drive the backlight module 4 to be detected, thereby achieving detection of the backlight module 4; the backlight module detection system can output the signal required for detecting the backlight module 4, and meanwhile, has a simple structure and low cost.

According to the embodiments of the present invention, the control unit 1 may include a first control module 11 and a storage module 12. The storage module 12 is used for storing the input code; the first control module 11 is used for outputting the control signal to the drive unit 2 based on the input code. Herein, the control signal outputted from the first control module 11 corresponds to the input code, that is, the input code directly determines the control signal outputted from the first control module 11 to the drive unit 2.

According to the embodiments of the present invention, the drive unit 2 may include a drive control module 21 and a drive module 22. The drive control module 21 is used for receiving the control signal, generating the drive control signal corresponding to the input code under the control of the control signal, and outputting the drive control signal to the drive module 22; the drive module 22 is used for receiving the drive control signal, and generating and outputting the drive signal corresponding to the input code based on the drive control signal. The drive signal can be used to drive the backlight module 4 to be detected so as to detect the backlight module 4 to be detected.

According to the embodiments of the present invention, the backlight module detection system may further include a processing and display unit 3, which is used for receiving the drive signal outputted from the drive module 22, and processing and displaying the drive signal. With the processing and display unit 3, the drive signal outputted by the backlight module detection system can be observed at a glance, which makes the driving and detection of the backlight module 4 by the detection system more clear and intuitive.

According to the embodiments of the present invention, the processing and display unit 3 may include an A/D conversion module 31, a second control module 32 and a display module 33. The A/D conversion module 31 is used for converting the drive signal from an analog quantity to a digital quantity, and transmitting the drive signal in a digital form to the second control module 32; the second control module 32 is used for receiving the drive signal in a digital form and controlling the display module 33 to display the drive signal in a digital form; and the display module 33 is used for displaying the drive signal in a digital form.

It should be noted that, according to the embodiments of the present invention, the drive signal outputted by the drive module 22 and used for driving the backlight module 4 may be an analog signal, but the second control module 32 can only receive a digital signal, so the A/D conversion module 31 is needed to convert the analog drive signal. Needless to say, if the drive module 22 outputs a digital drive signal, the digital drive signal can be directly provided to the second control module 32 without being converted by the A/D conversion module 31.

According to the embodiments of the present invention, the control unit 1 may be a single-chip microcomputer such as 89C51, and needless to say, the control unit 1 may be a central processing chip. The drive control module 21 includes a liquid crystal display module (LCM), which includes a drive circuit (i.e., a drive chip inside the LCM). The drive circuit can generate a pulse width modulated signal (PWM signal, i.e., the drive control signal) corresponding to the input code under the control of the control signal, and output the PWM signal to the drive module 22. Frequency and duty ratio of the PWM signal generated by the drive circuit in the liquid crystal display module are determined by the input code uniquely. The drive module 22 includes a light emitting diode drive circuit (e.g., RT8510 drive chip), which can receive the PWM signal, and generate and output a current signal corresponding to the frequency and duty ratio of the PWM signal based on the PWM signal, the current signal being the drive signal for driving the backlight module 4. The backlight module 4 includes a light emitting diode as a light source, and the current signal generated by the drive module 22 can be used to drive the light emitting diode. In this way, the light emitting diode in the backlight module 4 can be driven and detected.

According to the embodiments of the present invention, the processing and display unit 3 may further include a calculation module 34 used for calculating, based on the current signal outputted from the drive module 22, a voltage signal corresponding to the current signal and transmitting the voltage signal to the A/D conversion module 31. The A/D conversion module 31 is used for converting the received voltage signal from an analog quantity to a digital quantity, and transmitting the voltage signal in a digital form to the second control module 32. The calculation module 34 is further used for calculating, based on the voltage signal in a digital form received by the second control module 32, a current signal in a digital form corresponding to the voltage signal in a digital form, and transmitting the current signal in a digital form to the second control module 32; the second control module 32 is used for receiving the current signal in a digital form, and controlling the display module 33 to display the current signal in a digital form.

According to the embodiments of the present invention, the A/D conversion module 31 (e.g., ADC0809 A/D conversion chip), the second control module 32 and the calculation module 34 (e.g., LF398H calculation processing chip) are all integrated in the single-chip microcomputer or the central processing chip. The display module 33 is implemented by a liquid crystal display module (LCM), which may be the LCM adopted to implement the drive control module 21. Because the drive control module 21 and the display module 33 can be implemented by the same LCM, the control unit 1 and the drive control module 21 in the drive unit 2 in the embodiments of the present invention can be reused in the detection process of the backlight module 4. Specifically, the control unit 1 can not only be used for controlling the drive unit 2 to output the drive signal, but can also be used for controlling the drive control module 21 in the drive unit 2 to display the drive signal; the drive control module 21 can not only be used for outputting the drive control signal to the drive module 22, but can also be used for displaying the drive signal outputted by the drive module 22. With such a configuration, the backlight module detection system has a simpler structure and lower cost.

According to the embodiments of the present invention, the current signal outputted by the drive module 22 may have a value ranging from 100 μA to 1 mA. Compared with the backlight module detection system in the prior art, the backlight module detection system provided by the embodiments of the present invention can output a lower current drive signal, thus can detect the low current driving capacity of the backlight module 4 under certain circumstances (e.g., under a dark environment), and further can ensure that the backlight module 4 meets the requirement of the terminal manufacturers. The input code corresponds to the value of the output current signal. Therefore, the input code may be artificially set based on the current signal required for detecting the backlight module, and then be provided to the control unit 1, so as to control the backlight module detection system to output the current drive signal corresponding to the input code, so that the backlight module detection system can detect the backlight module 4 more easily.

Figure 2:
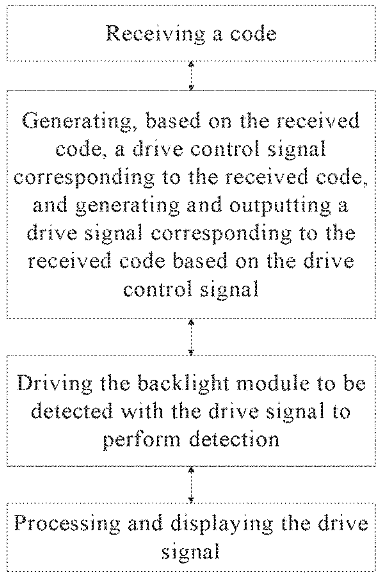
FIG. 2 is a flow chart of a backlight module detection method according to embodiments of the present invention.

Based on the above backlight module detection system, embodiments of the present invention further provide a backlight module detection method, and as shown in FIG. 2, the method comprises the following steps S1 to S3.

At step S1, a code is received,

In this step, the code is downloaded into a control unit (e.g., a single-chip microcomputer or a central processing chip) through a serial port.

At step S2, a drive control signal corresponding to the received code is generated based on the received code, and a drive signal corresponding to the received code is generated and outputted based on the drive control signal.

In this step, the drive unit may first generate the drive control signal based on the received code, and then generate and output the drive signal required for detection based on the drive control signal.

At step S3, the backlight module to be detected is driven by using the drive signal, to perform detection.

This step realizes lighting up and detection of the backlight module with the drive signal.

The backlight module detection method according to the embodiments of the present invention may further include step S4 of processing and displaying the drive signal.

With step S4, the backlight module detection method can be used to display the drive signal used for detection while detecting the backlight module, which makes the detection process more clear and intuitive.

In the backlight module detection method according to the embodiments of the present invention, the drive signal corresponding to the input code can be generated and output based on the input code, and since the input code is obtained by calculating the drive signal required for detecting the backlight module, the drive signal obtained by using the backlight module detection method can be used to drive the backlight module to be detected, thereby achieving detection of the backlight module.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A backlight module detection system, comprising a control unit and a drive unit, wherein, the control unit is used for outputting a control signal to the drive unit based on an input code; and the drive unit is used for generating a drive control signal corresponding to the input code under the control of the control signal outputted from the control unit, and generating and outputting a drive signal corresponding to the input code based on the drive control signal, the drive signal being a low current signal capable of driving a backlight module to be detected to detect whether the minimum brightness of the backlight module to be detected is lower than a preset threshold.

2. The backlight module detection system according to claim 1, wherein, the control unit comprises a first control module and a storage module, the storage module is used for storing the input code; and the first control module is used for outputting the control signal to the drive unit based on the input code.

3. The backlight module detection system according to claim 2, wherein, the drive unit comprises a drive control module and a drive module, the drive control module is used for receiving the control signal, generating the drive control signal corresponding to the input code under the control of the control signal, and outputting the drive control signal to the drive module; and the drive module is used for receiving the drive control signal, and generating and outputting the drive signal corresponding to the input code based on the drive control signal.

4. The backlight module detection system according to claim 3, further comprising a processing and display unit, which is used for receiving the drive signal outputted from the drive module, and processing and displaying the drive signal.

5. The backlight module detection system according to claim 4, wherein, the processing and display unit comprises an A/D conversion module, a second control module and a display module, the A/D conversion module is used for converting the drive signal from an analog quantity to a digital quantity, and transmitting the drive signal in a digital form to the second control module;

the second control module is used for receiving the drive signal in a digital form and controlling the display module to display the drive signal in a digital form; and the display module is used for displaying the drive signal in a digital form.

6. The backlight module detection system according to claim 5, wherein, the control unit comprises a single-chip microcomputer or a central processing chip;

the drive control module comprises a liquid crystal display module, which comprises a drive circuit capable of generating a pulse width modulated signal, as the drive control signal, corresponding to the input code under the control of the control signal, and outputting the pulse width modulated signal to the drive module;

the drive module comprises a light emitting diode drive circuit, which is used for receiving the pulse width modulated signal, and generating and outputting a current signal, as the drive signal, corresponding to frequency and duty ratio of the pulse width modulated signal based on the pulse width modulated signal; and the backlight module to be detected comprises a light emitting diode as a light source, and the current signal is used for driving the light emitting diode.

7. The backlight module detection system according to claim 6, wherein, the processing and display unit further comprises a calculation module used for calculating, based on the current signal outputted from the drive module, a voltage signal corresponding to the current signal and transmitting the voltage signal to the A/D conversion module;

the A/D conversion module is used for converting the received voltage signal from an analog quantity to a digital quantity, and transmitting the voltage signal in a digital form to the second control module;

the calculation module is used for calculating, based on the voltage signal in a digital form received by the second control module, a current signal in a digital form corresponding to the voltage signal in a digital form, and transmitting the current signal in a digital form to the second control module; and the second control module is used for receiving the current signal in a digital form, and controlling the display module to display the current signal in a digital form.

8. The backlight module detection system according to claim 7, wherein, the A/D conversion module, the second control module and the calculation module are all integrated in the single-chip microcomputer or the central processing chip; and the display module is implemented by the liquid crystal display module.

9. The backlight module detection system according to claim 6, wherein, the current signal outputted by the drive module has a value ranging from 100 μA to 1 mA; and the input code corresponds to the value of the current signal.

10. The backlight module detection system according to claim 1, wherein, the input code is obtained by calculating a drive signal required for detecting the backlight module to be detected.

11. A backlight module detection method, comprising steps of:

receiving a code;

generating, based on the code, a drive control signal corresponding to the code, and generating and outputting a drive signal corresponding to the code based on the drive control signal; and driving a backlight module to be detected by using the drive signal, to perform detection wherein the drive signal is a low current signal capable of driving the backlight module to be detected to detect whether the minimum brightness of the backlight module to be detected is lower than a preset threshold.

12. The backlight module detection method according to claim 11, further comprising a step of:

processing and displaying the drive signal.

13. The backlight module detection method according to claim 11, wherein, the code is obtained by calculating a drive signal required for detecting the backlight module to be detected.

* * * * *